United States Patent
Hjartfors et al.

(10) Patent No.: US 12,359,036 B2
(45) Date of Patent: Jul. 15, 2025

(54) FOAMABLE POLYOLEFIN COMPOSITION PROVIDING INCREASED FLEXIBILITY

(71) Applicant: Borealis AG, Vienna (AT)

(72) Inventors: Anna Hjartfors, Stenungsund (SE); Asa Wannerskog, Stenungsund (SE); Martin Anker, Stenungsund (SE); Lars Efraimsson, Stenungsund (SE); Anette Nilsson, Stenungsund (SE)

(73) Assignee: BOREALIS AG, Vienna (AT)

( * ) Notice: Subject to any disclaimer, the term of this patent is extended or adjusted under 35 U.S.C. 154(b) by 606 days.

(21) Appl. No.: 17/434,430

(22) PCT Filed: Mar. 5, 2020

(86) PCT No.: PCT/EP2020/055825
§ 371 (c)(1),
(2) Date: Aug. 27, 2021

(87) PCT Pub. No.: WO2020/178381
PCT Pub. Date: Sep. 10, 2020

(65) Prior Publication Data
US 2022/0135758 A1  May 5, 2022

(30) Foreign Application Priority Data
Mar. 6, 2019 (EP) .................................... 19160963

(51) Int. Cl.
| | |
|---|---|
| *C08J 9/08* | (2006.01) |
| *C08J 9/32* | (2006.01) |
| *C08K 5/092* | (2006.01) |
| *C08K 5/098* | (2006.01) |
| *C08K 5/11* | (2006.01) |
| *C08K 5/521* | (2006.01) |
| *C08K 7/22* | (2006.01) |
| *H01B 3/44* | (2006.01) |
| *H01B 13/14* | (2006.01) |

(52) U.S. Cl.
CPC . *C08J 9/08* (2013.01); *C08J 9/32* (2013.01); *C08K 5/092* (2013.01); *C08K 5/098* (2013.01); *C08K 5/11* (2013.01); *C08K 5/521* (2013.01); *C08K 7/22* (2013.01); *H01B 3/441* (2013.01); *H01B 13/142* (2013.01); *C08J 2203/02* (2013.01); *C08J 2207/06* (2013.01); *C08J 2323/06* (2013.01); *C08K 2201/019* (2013.01)

(58) Field of Classification Search
CPC ... C08J 9/08; C08J 9/32; C08J 2203/02; C08J 2207/06; C08J 2323/06; C08K 5/092; C08K 5/098; C08K 5/11; C08K 5/521; C08K 7/22; C08K 2201/019; H01B 3/441; H01B 13/142
USPC .......................................................... 521/59
See application file for complete search history.

(56) References Cited

FOREIGN PATENT DOCUMENTS

| | | | |
|---|---|---|---|
| CN | 103589070 A | 2/2014 | |
| CN | 201510318373.8 A | 2/2015 | |
| CN | 108690271 A | 10/2018 | |
| EP | 2812419 A1 * | 12/2014 | .......... C10M 131/08 |
| EP | 3182418 A1 * | 6/2017 | ............... C08J 9/04 |
| EP | 3182419 A1 * | 6/2017 | ............ C08J 9/0014 |
| JP | H1147967 A | 2/1999 | |
| JP | 11321930 A * | 11/1999 | |
| JP | H11321930 A | 11/1999 | |
| RU | 2372679 C | 11/2009 | |
| RU | 2638172 C2 | 12/2012 | |
| RU | 2500540 C2 | 12/2013 | |
| WO | WO-2005003199 A1 * | 1/2005 | ............ C08F 255/00 |
| WO | 2010096608 A2 | 8/2010 | |
| WO | 2017102463 A1 | 6/2017 | |
| WO | 2018049555 A1 | 3/2018 | |
| WO | WO-2019160295 A1 * | 8/2019 | ............... B29B 9/12 |

OTHER PUBLICATIONS

Ellen Chan et al. "Novel Thermally Conductive Thermoplastic/Ceramic Composite Foams", Macromolecular Materials and Engineering, 2012, vol. 297, No. 10, pp. 1014-1020 (Year: 2012).*
E. Chan et al. "Novel Thermally Conductive Thermoplastic/Ceramic Composite Foams", Macromolecular Materials and Engineering, 2012, vol. 297, No. 10, pp. 1014-1020 (Year: 2012).*
Patent Examination Report of Application No. 779799. Dated Jan. 4, 2024.
Peter Schroeck, et al. "Chemical Blowing Agents for Polyethylene" Handbook of Industrial Polyethylene and Technology, Chapter 34, published 2018.
Chong Hoon Lee, et al. "Growth of Gas Bubbles in the Foam Extrusion Process" Advances in Polymer Technology, vol. 19, No. 2, 97-112, published 2000.

(Continued)

*Primary Examiner* — Arrie L Reuther
(74) *Attorney, Agent, or Firm* — Lippes Mathias LLP

(57) ABSTRACT

The invention relates to a foamable polymer composition comprising a polyolefin polymer which polyolefin polymer does not bear silane moieties and comprises 20 to 99.99 wt. % linear low density polyethylene, and a blowing agent in an amount of 0.01 to 3 wt. % based on the total foamable polymer composition, wherein the blowing agent consists of citric acid and/or derivatives of citric acid or mixtures thereof. Further the invention relates to a foamable polymer composition comprising a polyolefin polymer, and a blowing agent in an amount of 0.01 to 3 wt. % based on the total foamable polymer composition, wherein the blowing agent consists of expandable polymeric microspheres, and the composition does not comprise fluororesin. Further the invention relates to a foamed polymer composition obtained by foaming this foamable polymer composition. Further the invention relates to the use of the foamable composition or the foamed polymer composition for a layer of a cable and a cable comprising at least one layer which comprises the foamable polymer composition or the foamed polymer composition.

8 Claims, No Drawings

(56) References Cited

OTHER PUBLICATIONS

Russian Search Report for Application No. PCT/EP2020/055825 Dated May 18, 2022.
Ellen Chan et al: "Novel Thermally Conductive Thermoplastic/ Ceramic Composite Foams", Macromolecular Materials and Engineering., vol. 297, No. 10, Oct. 1, 2012 (Oct. 1, 2012), pp. 1014-1020, XP055471111, DE ISSN: 1438-7492, DOI: 10.1002/mame.201100400.
International Search Report dated Jul. 9, 2020 in PCT/EP2020/055825.

* cited by examiner

FOAMABLE POLYOLEFIN COMPOSITION PROVIDING INCREASED FLEXIBILITY

This application is a 371 of PCT Application Serial No. PCT/EP2020/055825, filed Mar. 5, 2020, which claims priority to European Application Serial No. 19160963.5, filed Mar. 6, 2019, the contents of which are included herein in their entirety.

TECHNICAL FIELD

The invention relates to a foamable polymer composition comprising a polyolefin polymer and a blowing agent and a foamed polymer composition obtained by foaming this foamable polymer composition. Further the invention relates to the use of the foamable composition or the foamed polymer composition for the production of a layer of a cable and a cable comprising at least one layer which comprises the foamable polymer composition or the foamed polymer composition.

BACKGROUND

In wire and cable (W&C) applications a typical cable comprises a conductor surrounded by one or more layers of polymeric materials. The cables are commonly produced by extruding the layers on a conductor.

Power cables are defined to be cables transferring energy operating at any voltage level. The voltage applied to a power cable can be alternating (AC), direct (DC) or transient (impulse). Moreover, power cables are typically indicated according to their level of operating voltage, e.g. a low voltage (LV), a medium voltage (MV), a high voltage (HV) or an extra high voltage (EHV) power cable, which terms are well known. Power cable is defined to be a cable transferring energy operating at any voltage level, typically operating at voltage higher than 100 V. LV power cables typically operates at voltages of below 3 kV. MV and HV power cables operate at higher voltage levels. A typical MV power cable usually operates at voltages from 3 to 36 kV, and a typical HV power cable at voltages higher than 36 kV. LV power cables usually comprise an electric conductor, an insulation layer and an outer jacket. Typically MV power cables comprise a conductor surrounded by an inner semiconductive layer, an insulation layer, an outer semiconductive layer and an outer jacket, and in that order.

Moreover, between the cable jacket and outer semiconductive layer in MV power cables (above 6 kV), and between the cable jacket and the insulation in LV power cables (1 to 3 kV) there is usually always a metal screen. This metal screen is connected to earth. The metallic screen is holding the electromagnetic field inside the power cable and is protecting the power cable insulation by keeping the electrical potential at the outer semiconductive layer or the insulation constant. In a majority of the cables this metallic screen consists of copper threads but it can also be of aluminum or copper tape as well. The dimension thickness of the copper threads is specified and designed for worst case scenario, e.g. when a lightning strike or electrical breakdowns occurs in the cable when high electrical currents can be developed in the metal screen. The thickness of the copper threads is specified so the temperature of the metal screen should, with a good margin, not exceed the melting point of the jacket.

A typical electric cable generally comprises a conductor that is surrounded by one or more layers depending on the application area. E.g. power cable has several layers of polymeric materials including an inner semiconducting layer, followed by an insulating layer, and then an outer semiconducting layer. To these layers, one or more further auxiliary layer(s) may be added. The outer protecting polymeric layer is known i.a. as a jacketing layer.

Safety, reliability and long use life are important key factors required for cable applications. As the outer jacketing layer provides the outer protection of the cable, it plays an important role to provide system functionality.

Moreover, the cable industry wants flexible cables which are easy to install. Further, there is also an extra high demand for the flexibility of the power cables when the cables are to be installed in power stations.

Low density polyethylene (LDPE) which is e.g. produced in a high pressure process has been conventionally used in all types of cable layers including jacketing layers. The drawback thereof is their unsatisfactory mechanical properties required for a protective jacketing layer.

Linear low density polyethylene (LLDPE) is known i.a. as a jacketing layer material. However and typically, also the LLDPE is not fully satisfactory as regards to the mechanical properties required for a polymer in a cable layer, such as a jacketing layer.

The mechanical properties of the layer can be improved by increasing the density of the polyethylene. High density polyethylene (HDPE) polymers indeed provide i.a. improved mechanical strength to a cable layer, such as abrasion resistance. However, HDPE has a disadvantage of limited stress cracking resistance, expressed e.g. as ESCR, and decreased flexibility required i.a. for a jacketing layer. Non flame retardant jacketing is an integrated part of all application areas and jacketing materials are typically based either of PVC or PE. PE resins have due to the good barrier and mechanical performance been used for a long time in different cable jacketing applications. In power cables, HDPE or MDPE are the predominant materials used due to requirements for high temperature resistance, high abrasion resistance and mechanical strength. Especially bimodal HDPE materials provide a good combination of properties. In traditional external multipair and coaxial telecommunication cables, LDPE has largely been replaced by LLDPE that is a tougher, low shrink material, although HDPE and MDPE are also employed. In fibre optic cables, LLDPE or MDPE is commonly used for the long truck networks and for access networks HDPE is often specified as jacket material. In small cable constructions, flexible LLDPE, LDPE or copolymer grades are used. In general multimodal PE is preferred over unimodal PE from processability and mechanical performance point of view.

In order to be correctly installed with simple and quick operations, a cable needs to be particularly flexible so that it can be inserted into the wall passages and/or wall conduits and follow the bends of the installation path without being damaged. It is also desirable to have a cable with enhanced flexibility while still having the required toughness and abrasion resistance for demanding installation conditions. When cables are being installed they might be pulled in a trench requiring a particular toughness of the jacketing material for not being damaged during installation. Decreasing the weight and increasing the flexibility of an electric cable can reduce the damages to the cable during customer installation caused by tearing or scraping actions but still toughness is required. Furthermore, flexibility of the cable can be increased by manufacturing a cable containing expanded rather than solid jacket with favorable results in the installation process of the cable.

It is thus known that by foaming a layer material flexibility increases. However, it is also known that expansion decreases toughness and will thus deteriorate the tensile properties such as stress at break.

Foaming of polyolefin composition can be done either using chemical blowing agents, physical blowing agents, or expandable polymeric microshperes or a combination of thereof. Chemical blowing agents are substances which release blowing gas through thermal decomposition reactions and the chemical blowing agent is consumed in the foaming reaction. Examples of such substances are hydrazine, hydrazide, or azodicarbonamide, or those based on combinations of solid organic acids (or a metal salt thereof) and alkali metal carbonate (s) or alkali metal bicarbonate (s), such as combination of citric acid/derivate of citric acid and sodium bicarbonate.

Physical blowing agents are gasses which are injected directly into the polymer melt. In such processes it is common to use chemical blowing agents as cell nucleators as the gas formed by the blowing agent reaction serves as nucleating points with lower energy for bubble formation. The gas used as physical blowing agent can be for example $N_2$ or $CO_2$. Both chemical and physical foaming extrusion processes are used for extrusion of foamed communication cable insulation. In chemical foaming, all the blowing gas comes from decomposition of a chemical blowing agent.

Expandable microspheres are characterized by having a polymeric wall surrounding one or more pockets or particles of blowing agent or propellant within the microsphere. The polymeric wall may have reactive functional groups on its surface to give a fusible microsphere. When the microspheres are heated, they expand to form microballoons comprising polymeric shells.

Foamable polyolefin compositions are for example described in WO2018/049555 A1, EP1243957 A2 or WO 2017/102341.

It is generally desirable to obtain as great as degree of expansion as possible while still achieving the desired mechanical properties; in particular a higher degree of expansion will result in reduced material costs by increasing the space occupied by voids. In addition by having more space occupied by voids, the jacket is more capable of adsorbing forces applied externally to the cable. As said increased flexibility provides cables which are easier to install, however tensile properties are important as well. More specifically, it is desired that the stress at break preferably fulfils the limits set by the International Standard IEC60501-1 and IEC60502-2 for power cables with extruded insulation and their accessories for rated voltages from 1 kV up to 30 kV and cables for rated voltages from 6 kV up to 30 kV.

Hence, it is thus important to find a balance of flexibility which is improved by foaming a layer material as well as acceptable tensile properties which becomes inferior by foaming.

Another aspect is that the traditional jacketing materials are linear polymers with low melt strength. Melt strength is needed so that the cell may grow without bursting during foaming.

Objects

It is an object of the invention to provide a foamable or foamed polymer composition which overcomes the above-mentioned problems. Hence, it is an object of the invention to provide a foamable or foamed polymer composition having a balance of flexibility and tensile properties. The foamable composition or the foamed polymer composition can be used for a layer of a cable, preferably for a jacketing layer.

A further object of the invention is to provide a cable comprising at least one layer which comprises the foamable polymer composition or the foamed polymer composition.

DETAILED DESCRIPTION OF THE INVENTION

The present invention is based on the surprising finding that all the above-mentioned objects can be solved by using a blowing agent comprising citric acid and/or derivatives of citric acid or expandable polymeric microspheres, in a foamable polymer composition.

Therefore, in a first aspect the invention provides a foamable polymer composition comprising
(A) a polyolefin polymer which polyolefin polymer does not bear silane moieties and comprises 20 to 99.99 wt. % linear low density polyethylene, and
(B) a blowing agent in an amount of 0.01 to 3 wt. % based on the total foamable polymer composition, wherein the blowing agent consists of citric acid and/or derivatives of citric acid.

In a second aspect the invention provides a foamable polymer composition comprising
(A) a polyolefin polymer, and
(B) a blowing agent in an amount of 0.01 to 3 wt. % based on the total foamable polymer composition, wherein the blowing agent consists of expandable polymeric microspheres,
and the composition does not comprise fluororesin.

The invention further provides a foamed polymer composition obtained by foaming a foamable polymer composition according to the first and second aspect. The foamable composition according to the first and second aspect or the respective foamed polymer composition can be used for a layer of a cable, preferably for a jacketing layer.

Further provided is a cable comprising at least one layer which comprises the foamable polymer composition or the foamed polymer composition according to the first and second aspect.

The foamable or foamed composition of the present invention enables the production of a layer for a cable having a balance of flexibility and tensile properties. Thus, the foamable or foamed composition as described herein enables flexible cables which are easy to install. Further, the foamable or foamed composition provides also increased resistance to break during, for example, ploughing of the cables during installation, as the cables of the present invention, are because of their increased flexibility and still good break resistance less easily likely to be destroyed by, e.g., hard and/or sharp rocks. Furthermore, the cable jacket composition of the present invention, enables cables which are less costly and more sustainable as less material are required in the layers of a cable.

The present invention in a first aspect uses citric acid and/or derivatives of citric acid or in a second aspect expandable polymeric microspheres as a blowing agent. Generally, a blowing agent is a substance which is capable of producing a cellular structure via a foaming process in the foamable polymer composition. A blowing agent is typically applied when the polymer is melted. The cellular structure in the polymer matrix reduces density of the foamable polymer composition. Flexibility is mainly affected by the density.

Citric acid is an endothermic blowing agent. By an "exothermic foaming agent" it is herein meant a compound or a mixture of compounds which is thermally unstable and which decomposes to yield gas and heat within a certain temperature interval. Further, by an "endothermic foaming agent" it is herein meant a compound or a mixture of compounds which is thermally unstable and causes heat to be absorbed while generating gas within a certain temperature interval.

Such endothermic blowing agents are easy to control as constant supply of heat is needed for the reaction to continue. This also enables better control of gas release from the blowing agent, especially during continuous processes such as extrusion.

Another advantage of citric acid or a derivative of citric acid is that during decomposition they release $CO_2$ as the main blowing gas. $CO_2$ has better solubility in the foamable polymer composition, compared to $N_2$ that is released from hydrazine, hydrazide, or azodicarbonamide (ADCA).

Citric acid and derivatives of citric acid decomposes into water, carbon dioxide and solid decomposition products. The decomposition reactions are endothermic meaning that a continuous supply of heat energy is required in order for it to occur. The temperature at which the decomposition reactions occur at a fast rate depends on the chemical substance (citric acid or a citric acid derivate), but is typically around 200° C. The decomposition temperatures of citric acid and derivatives of citric acid are well above the melting points of polyolefin polymers and can thus be compounded into the polyolefin polymer prior to cable extrusion without pre-decomposition in the mixing step.

In the first aspect the blowing agent consists of citric acid and/or its derivatives. The advantage of using only "one" blowing agent (B) is to even better control the foaming process as only one decomposition temperature interval has to be taken into account during processing which reduces the complexity of the process.

In the first aspect wherein the blowing agent consists of citric acid and/or its derivatives, the amount of blowing agent (B) is preferably 0.02 wt. % to 2.0 wt. %, more preferably 0.05 wt. % to 1.0 wt. %, most preferably 0.1 wt. % to 0.5 wt. %, based on the total foamable polymer composition.

Preferably, the derivative of citric acid comprises alkali metal salts of citric acid, esters of citric acid or mixtures thereof. The alkali metal salts of citric acid preferably comprises one or more selected from the group consisting of monosodium citrate, disodium citrate, trisodium citrate, monopotassium citrate, dipotassium citrate and tripotassium citrate.

In the first aspect wherein the blowing agent is citric acid and/or its derivatives and/or mixtures, the foamable polymer composition preferably further comprises a mineral nucleating agent (C). The mineral nucleating agent (C) is typically a mineral with high surface area. The interface between the mineral nucleating agent (C) and the polymer composition melt will serve as nucleating sites for bubble formation during the foaming process as the energy required for bubble formation is lower in this interface than in the bulk polymer melt. The mineral nucleating agent (C) preferably comprises a magnesium-containing compound, a calcium-containing compound, a silicon-containing compound or mixtures thereof. The mineral nucleating agent (C) can be any mineral filler, for example silica, talc, calcium carbonate, kaolin, dolomite, zeolites, mica wollastonite or clay mineral.

To obtain a high and uniform distribution of the mineral nucleating agent (C) in the foamable polymer composition, the mineral nucleating agent (C) is added to, preferably compounded with or melt mixed with, the foamable polymer composition. The mineral nucleating agent (C) has preferably the form of a powder, i.e. the form of small particles. The average particle size is usually in the order of 0.1 μm to 50 μm.

Preferably, a blowing agent masterbatch (BAMB) is used which comprises citric acid and/or its derivatives and the mineral nucleating agent (C) as described above. The blowing agent masterbatch may further comprise a polymeric carrier, such as a polyethylene carrier. More preferably the blowing agent masterbatch consists of said blowing agent (B) and the nucleating agent (C) and the polymeric carrier. The blowing agent masterbatch is added to, preferably compounded with or melt mixed with, the foamable polymer composition.

The distribution of citric acid and/or its derivatives in the polymer composition is improved by preferably melt mixing the blowing agent masterbatch into the foamable polymer composition by compounding prior to the extrusion of the foamable polymer composition in an extruder. This results in improved cell structure as the gas released from decomposition of the citric acid and/or its derivatives is better distributed in the polyolefin polymer melt. For communication cables it is critical to have a good cell structure within the foamed insulation in order to have isotropic electrical properties. It is desired to have a cell structure with many small cells evenly distributed within the insulation. The cell structure is also important for mechanical properties. Having many small cells that are well distributed will give better crush resistance compared to a structure with larger cells that are not homogeneously distributed as this will give weak parts in the insulation.

In a second aspect, the blowing agent (B) consists of expandable polymeric microspheres. The expandable polymeric microspheres can act as a blowing agent when mixed in a product and heated to cause expansion within the matrix. Similarly also for the expandable polymeric microspheres expansion is easy to control by constant supply of heat for the reaction.

Expandable polymeric microspheres are adapted to expand when exposed to heat as described in U.S. Pat. No. 3,615,972. These microspheres are monocellular particles comprising a body of resinous material encapsulating a volatile fluid. When heated, the resinous material of thermoplastic microspheres softens and the volatile material expands causing the entire microsphere to increase substantially in size. On cooling, the resinous material in the shell of the microspheres ceases flowing and tends to retain its enlarged dimension the volatile fluid inside the microsphere tends to condense, causing a reduced pressure in the microsphere. Another advantage of these expandable polymeric microspheres is that they do not release any gas.

Typically, expandable polymeric microspheres are made of a thermoplastic polymer shell e.g. methyl methacrylate and acrylonitrile, methyl methacrylate, acrylonitrile and vinylidene chloride, o-chlorostyrene, p-tertiarybutyl styrene, vinyl acetate and their copolymers, i.e., styrene-methacrylic acid, styrene-acrylonitrile, styrene-methyl methacrylate The gas inside the shell can be an aliphatic hydrocarbon gas, e.g. isobutene, pentane, or iso-octane. These microspheres may be obtained in a variety of sizes and forms, with expansion temperatures generally ranging from 80 to 130° C. Expandable polymeric microspheres are commercially available, for example, from Akzo Nobel under the trademark EXPANCEL™, and from Henkel under the trademark DUALITE™. The term "expandable microsphere" as used in this disclosure is intended to encompass any hollow resilient container filled with volatile fluid which is adapted to expand. The microspheres are typically ball-shaped particles but may have other shapes as well, e.g., tubes, ellipsoids, cubes, particles and the like, all adapted to expand when exposed to an energy source.

In the second aspect wherein the blowing agent (B) consists of expandable polymeric microspheres, the composition does not comprise a fluororesin. Flouroresins are resins comprising fluorocarbon bonds, for example, polytetrafluorethylene (PTFE). Moreover, also for this aspect the advantage of using only "one" blowing agent (B) is to even better control the foaming process as only one temperature interval has to be taken into account during processing which reduces the complexity of the process.

In the second aspect wherein the blowing agent (B) consists of expandable polymeric microspheres, the amount of blowing agent is preferably 0.02 to 2 wt. %, more preferably 0.05 to 1 wt. % most preferably 0.1 to 0.5 wt. % based on the total weight of the foamable polymer composition.

The expandable polymeric microspheres are preferably compounded with or melt mixed with the foamable polymer composition. Preferably, a blowing agent masterbatch (BAMB) is used which comprises the expandable polymeric microspheres and a carrier resin such as a copolymer of ethylene vinyl acetate. Preferably the blowing agent masterbatch comprises 80 to 20 wt. % of expandable polymeric microspheres, more preferably 70 to 60 wt. % of expandable polymeric microspheres. More preferably the blowing agent masterbatch consists of said blowing agent (B) and the polymeric carrier resin.

The blowing agent masterbatch is added to, preferably compounded with or melt mixed with, the foamable polymer composition. Also for the expandable polymeric microspheres the distribution in the polymer composition is improved by preferably melt mixing the blowing agent masterbatch into the foamable polymer composition by compounding prior to the extrusion of the foamable polymer composition in an extruder.

In the first aspect, the polyolefin polymer (A) does not bear silane moieties and comprises at least 20 to 99.99 wt. % linear low density polyethylene (LLDPE) based on the total weight of the foamable composition. In the second aspect the polyolefin polymer (A) preferably does not bear silane moieties and comprises at least 20 to 99.99 wt. % linear low density polyethylene based on the total weight of the foamable composition. Hence, in the first aspect and also preferably in the second aspect the present invention uses a polyolefin polymer which shall not be crosslinked and thus does not bear silane moieties. Hence, there is no necessity for introducing silane moieties into the polyolefin polymer. Crosslinking could be used to increase branching and thus melt strength.

Melt strength is needed for chemical and physical foaming. Specifically, in the first aspect wherein citric acid and/or its derivatives is used as a blowing agent, in order to foam a polyolefin polymer composition it is necessary that the polyolefin polymer composition has a good melt strength without crosslinking as too poor melt strength results in a collapsed cell structure which is not good for either mechanical or electrical properties of the cable layer. However, for expandable microspheres the microspheres polymer shell hinders the bubble from rupturing and therefore melt strength is not necessary.

Nevertheless, for both aspects the polyolefin polymer (A) preferably has an MFR2 of 0.1 to 10 g/10 min, more preferably of 0.2 to 5 g/10 min measured according to ISO 1133 at 190° C. and a load of 2.16 kg. This MFR range is also preferred from a processing perspective as lower MFRs polymers would be very viscous and difficult to foam. Too high MFR materials are not preferred as the melt strength of the polymer decreases with increasing MFR and a good melt strength is of importance for the foaming process.

Polyethylene density is normally used for classification of different types of polyethylene—HDPE, MDPE, LLDPE, LDPE, VLDPE and ULDPE. The density of polyethylene is directly related to the crystallinity of the material, and thus the melting point as the melting point is essentially determined by the lamellar thickness of the crystalline fraction. Pure linear PE with high crystallinity has a density of typically of 960 to 970 kg/m$^3$, i.e. about 965 kg/m$^3$ and melting point of typically of 125 to 135° C., i.e. around 130° C. With decreasing polyethylene density the melting point is lowered.

The polyolefin polymer (A) for both aspects preferably has a density of 880 to 950 kg/m$^3$, more preferably 890 to 940 kg/m$^3$, most preferably 900 to 930 kg/m$^3$ measured according to ISO 1183-1 on samples prepared according to ISO 1872-2.

Furthermore the following preferred aspects pertain equally to both first and second aspects of the invention.

The polyolefin polymer (A) of the foamable polymer composition preferably comprises 50 to 99 wt. %, more preferably 70 to 95 wt. % and most preferably 80 to 90 wt. % linear low density polyethylene based on the total weight of the foamable composition.

The linear low density polyethylene (LLDPE) is a homopolymer or copolymer. Homopolymer means that the linear low density polyethylene (LLDPE), respectively, comprise at least 90 wt. % ethylene monomer, preferably at least 95 wt. % ethylene monomer, and most preferably at least 99 wt. % ethylene monomer. In case the linear low density polyethylene (LLDPE) is a copolymer, the copolymer comprises ethylene monomer and one or more comonomer(s). The comonomer can be alpha-olefins having 3 to 12 carbon atoms, e.g. propene, butene, hexene, octene, decene. Preferably, the linear low density polyethylene (LLDPE) is a copolymer. More preferably, the linear low density polyethylene (LLDPE) is a copolymer of ethylene and butene.

Preferably, the LLDPE has an MFR2 of 0.1 to 10 g/10 min, more preferably 0.2 to 5.0 g/10 min, most preferably 0.5 to 2.0 g/10 min.

Preferably, the LLDPE has a density of 880 to 930 kg/m$^3$, more preferably 910 to 925 kg/m$^3$, more preferably 917 to 923 kg/m$^3$, measured according to ISO 1183-1 on samples prepared according to ISO 1872-2.

The linear low density polyethylene (LLDPE) polymer is polymerised in low pressure process, and is, for example, an LLDPE homopolymer or an LLDPE copolymer of ethylene with one or more comonomer(s) as described above. Further, the LLDPE is polymerised in a low pressure polymerisation process in the presence of a catalyst. The catalyst can be for example a Phillips catalyst, a metallocene catalyst or a Ziegler-Natta catalyst. A Phillips catalyst is preferred. The polymerisation can be for example either gas phase polymerisation, slurry polymerisation or a combination of slurry polymerisation/gas-phase polymerisation or gas-phase polymerisation/gas-phase polymerisation. The polymerisation can also be solution polymerisation.

The polymerisation can be performed in one reactor or in several reactors in series, resulting in uni-, bi- or multimodal polyethylene. By the "modality" of a polymer is meant the structure of the molecular weight distribution of the polymer, i.e. the appearance of the curve indicating the number of molecules as a function of the molecular weight. If the curve exhibits one maximum, the polymer is referred to as "unimodal", whereas if the curve exhibits a very broad maximum or two or more maxima and the polymer consists of two or more fractions, the polymer is referred to as "bimodal", "multimodal" etc. For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In the production of unimodal polyethylene, an ethylene polymer is produced in a reactor under certain conditions with respect to monomer composition, hydrogen gas pressure, temperature, pressure, and so forth. As comonomer, use is commonly made of other olefins having up to 12 carbon atoms, such as a-olefins having 3-12 carbon atoms, e.g. propene, butene, 4-methyl-1-pentene, hexene, octene, decene, etc., in the copolymerisation of ethylene.

In the production of, say, a bimodal polyethylene, a first ethylene polymer is produced in a first reactor under certain conditions with respect to monomer composition, hydrogen gas pressure, temperature, pressure, and so forth. After the polymerisation in the first reactor, the reaction mixture including the polymer produced is fed to a second reactor, where further polymerisation takes place under other conditions. Usually, a first polymer of high melt flow rate (low molecular weight) and with a moderate or small addition of comonomer, or no such addition at all, is produced in the first reactor, whereas a second polymer of low melt flow rate (high molecular weight) and with a greater addition of comonomer is produced in the second reactor. As comonomer, use is commonly made of other olefins having up to 12 carbon atoms, such as a-olefins having 3-12 carbon atoms, e.g. propene, butene, 4-methyl-1-pentene, hexene, octene, decene, etc., in the copolymerisation of ethylene. The resulting end product consists of an intimate mixture of the polymers from the two reactors, the different molecular weight distribution curves of these polymers together forming a molecular weight distribution curve having a broad maximum or two maxima, i.e. the end product is a bimodal polymer mixture. The linear low density polyethylene is preferably unimodal.

As said, for foaming it is necessary that the polyolefin polymer composition has good melt strength. Melt strength is increased with increasing amount of long chain branching in the polymer. Thus linear polymers as LLDPE and HDPE generally have poor melt strength. The melt strength is preferably improved by blending in a LDPE in the foamable polyolefin polymer composition and to ensure a foamed layer with a closed cell structure and homogeneous cell distribution.

Preferably, the polyolefin polymer (A) further comprise 0.1 to 80 wt. %, more preferably 1 to 60 wt. %, more preferably 5 to 40 wt. % low density polyethylene and most preferably 10 to 20 wt. % low density polyethylene based on the total weight of the foamable polymer composition.

The low density polyethylene (LDPE) is a homopolymer or copolymer. More preferably, the low density polyethylene (LDPE) is a homopolymer. A homopolymer is preferred as the main reason for adding LDPE to the blend is to improve melt strength and this property arises from the long chain branched structure of LDPE and is independent of comonomers.

Preferably, the LDPE has an MFR2 of 0.1 to 10 g/10 min, more preferably 0.2 to 5.0 g/10 min, most preferably 1.0 to 3.0 g/10 min.

Preferably, the LDPE has a density of 880 to 930 kg/m$^3$, more preferably 910 to 927 kg/m$^3$, more preferably 920 to 925 kg/m$^3$, measured according to ISO 1183-1 on samples prepared according to ISO 1872-2.

The low density polyethylene (LDPE) polymer is polymerised in a high pressure radical polymerisation process potentially in the presence of one or more comonomer(s). Further, the LDPE is polymerised in a high pressure polymerisation process in the presence of an initiator(s) and optionally chain transfer agents to control the MFR.

The LDPE can be produced in for example a tubular polymerisation reactor, or in an autoclave polymerisation reactor, suitably a tubular polymerisation reactor.

Preferably, the polyolefin polymer (A) which does not bear silane moieties comprises 20 to 99.99 wt. % linear low density polyethylene and 0.1 to 80 wt. % low density polyethylene, more preferably 50 to 99 wt. % linear low density polyethylene and 1 to 60 wt. % low density polyethylene, more preferably 70 to 95 wt. % linear low density polyethylene and 5 to 40 wt. % low density polyethylene most preferably 80 to 90 wt. % linear low density polyethylene and 10 to 20 wt. % low density polyethylene based on the total weight of the foamable polymer composition.

Preferably, the composition comprises polyolefin polymer (A) which does not bear silane moieties and comprises 20 to 99.99 wt. % linear low density polyethylene and 0.1 to 80 wt. % low density polyethylene and a blowing agent (B) in an amount of 0.01 to 3.0 wt. %, wherein the blowing agent consists of citric acid and/or derivative of citric acid or mixtures or consists of expandable polymeric microspheres, more preferably 50 to 99 wt. % linear low density polyethylene and 1 to 60 wt. % low density polyethylene and said blowing agent (B) in an amount of 0.02 to 2.0 wt. %, more preferably 70 to 95 wt. % linear low density polyethylene and 5 to 40 wt. % low density polyethylene and said blowing agent (B) in an amount of 0.05 to 1.0 wt. %, most preferably 80 to 90 wt. % linear low density polyethylene and 10 to 20 wt. % low density polyethylene and said blowing agent (B) in an amount of 0.1 to 0.5 wt. % all based on the total weight of the foamable polymer composition.

Preferably, the foamable polymer composition comprises at least 90 wt. % of polyolefins. Preferably, all the polymers in the polymer composition only comprises polyethylene.

Preferably, similar to the second aspect also in the first aspect the foamable polymer composition does not comprise fluororesin. Preferably, in both aspects the foamable polymer composition does not comprise an azo compound and/or physical blowing agents.

Azo compounds are azodicarbonamide, azobisisobutyronitrile, or diazoaminobenzene.

Physical blowing agents are gasses which are injected at high pressure directly into an extrusion cylinder. Such gasses are for example nitrogen, carbon dioxid, air and low boiling hydrocarbons such as propane and butane.

The present invention has thus the advantage that inventive foamable polymer composition can be foamed into a foamed polymer composition without using noxious blowing agents such azo compounds, fluororesin, and physical blowing agents.

More preferably, in both aspects the foamable polymer composition does not comprise any further blowing agent.

The foamable polymer composition preferably comprises an antioxidant. The antioxidant is preferably a phenolic antioxidant, a phosphorous containing antioxidant or a blend thereof. The phenolic antioxidant is preferably a blend of pentaerythrityl-tetrakis(3-(3'-(5'-di-tert-butyl-4-hydroxyphenyl)-propionate (CAS-no. 6683-19-8; commercially available from BASF under trade name Irganox 1010) and tris-(2,4-di-tert-butylphenyl)phosphite (CAS-no. 31570-04-4; commercially available from BASF under trade name Irgafos 168). This antioxidant blend is commercially available as Irganox B561 from BASF.

The antioxidant is present preferably in an amount of 0.01 wt. % to 2 wt. %, more preferably in an amount of 0.04 wt. % to 1 wt. %, and most preferably in an amount of 0.06 wt. % to 0.5 wt. %, based on the total foamable polymer composition.

The foamable polymer composition preferably comprises an acid scavenger. The acid scavenger is preferably a calcium stearate, a sodium stearate, a zinc stearate, or mixtures thereof, more preferably a calcium stearate.

The amount of acid scavenger is preferably 0.01 wt. % to 2.0 wt. %, more preferably 0.02 wt. % to 1.0 wt. %, and most preferably 0.04 wt. % to 0.5 wt. %, based on the total foamable polymer composition.

A foamed polymer composition can be obtained by foaming the foamable polymer composition according to the invention.

Foaming is done by heating the foamable polymer composition to a temperature of preferably 150° C. to 240° C., more preferably 180° C. to 235° C., even more preferably to 210° C. to 230° C. In this temperature ranges the blowing agent (B) present in the foamable polymer composition in case of citric acid or derivatives of citric acid thermally decomposes into gaseous products as described above or in case of microspheres the resinous material of thermoplastic microspheres softens and the volatile material expands as described above, thereby leading to a foamed polymer composition.

The foaming process includes mixing and homogenization of the components in the first part of an extruder followed by optimization of foaming properties (e.g. degree of foaming and cell structure, size and distribution in a layer of a cable) in the end of the extruder, die and outlet from the extruder head. Furthermore, the process step for manufacturing the foamed composition and the cable layer, may comprise any ordinary extruder, e.g. a single screw extruder.

The foaming degree might be controlled by changing extrusion parameters such as, for example, adjusting the temperature settings on the extruder and/or extruder head, line speed, screw speed, extruder die position, cooling bath position and cooling water temperature.

The foamed polymer composition preferably has a flexural modulus of 10 to 300 MPa, more preferably 50 to 250 MPa, most preferably more than 100 and less than 219 MPa when measured according to ISO 178. The foamed polymer composition preferably has a flexural modulus of at least 10 MPa when measured according to ISO 178.

The foamed polymer composition preferably has an expansion degree of 2 to 30%, more preferably 3 to 20%, more preferably 4 to 17%, most preferred 5 to 13.7%.

The "degree of expansion" (G), is defined as:

$$G=(d_0/d_e-1)\times 100$$

where $d_0$ indicates the density of the unexpanded polymer and de represents the measured apparent density, or weight per unit volume in g/cm³, of the expanded polymer.

The foamed polymer composition preferably has a stress at break of 12.5 to 50 MPa, more preferably 13 to 40 MPa, still more preferably 14 to 30 MPa, most preferably at least 14 to 20 MPa measured according to ISO 527-1 and ISO 527-2.

The foamed polymer composition preferably has a strain at break of 400 to 1500%, more preferably 500 to 1000%, most preferably 550 to 790% measured according to ISO 527-1 and ISO 527-2.

The invention further pertains the use of the foamable or the foamed polymer composition for the production of a layer of a cable. Preferably, the foamable or the foamed polymer composition are used for the production of a jacketing layer.

The invention further pertains a cable comprising the foamable polymer composition, or the foamed polymer composition. More preferably, the cable comprises at least one layer which comprises the foamable polymer composition, or the foamed polymer composition. The cable may be a power cable, e.g. a LV, MV or HV cable, for example a LV or MV cable, e.g. a LV cable; or may be a communication cable.

Preferably, the cable comprises a conductor surrounded by one or more layer(s) wherein at least one layer contains the foamable or the foamed polyethylene polymer composition. Preferably, the jacketing layer comprises the foamable or foamed polymer composition.

In a first example of a process for manufacturing a power cable, or a communication cable, the polyolefin material and the blowing agent and potentially further additives are combined together suitably by compounding in a conventional manner, e.g. by extrusion with a screw extruder or a kneader. The obtained meltmixture of the polyolefin polymer and the blowing agent may then suitably be pelletized. Further, the obtained pellets can be of any size and shape.

That may be carried out in a cable production line, for example, in a mixer preceding the cable extruder or in the cable extruder, or in both. The obtained mixture is used to form a cable layer. The process for manufacturing the power cable, or a communication cable, comprises extrusion of the provided foamable composition on the cable core to form a cable jacket.

A suitable process in accordance with the process for manufacturing a power cable, or a communication cable, as described herein, comprises the step of applying on a conductor, e.g., by coextrusion, one or more layers, wherein at least one layer, i.e. an outer protective layer (jacket) comprises, for example, consists of, the foamable composition comprising a polyolefin material, and a blowing agent, wherein the composition will comprise 0.01 to 3.0% by weight of the blowing agent, with respect to the total weight of the polymer composition.

The term "coextrusion" means herein that in case of two or more layers, said layers can be extruded in separate steps, or at least two or all of said layers can be coextruded in a same extrusion step, as well known in the art. The term "coextrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer. Coextrusion can be effected in any conventional cable extruder, e.g. a single or twin screw extruder.

As well known a meltmix of the foamable polymer composition or component/s thereof, may be applied to form a layer. Meltmixing means mixing above the melting point of at least the major polymer component(s) of the obtained mixture and is carried out, for example, without limiting to, in a temperature of at least 15° C. above the melting or softening point of polymer component(s). The meltmixing can be carried out in the cable extruder or in a mixer, e.g. kneader, preceding the extruder, or in both.

Further, the process for manufacturing the power cable, or a communication cable, comprises foaming the cable jacket, said foaming occurs when the melt of the provided blend leaves the cable extruder as this results in a pressure drop as the atmospheric pressure is lower than the pressure inside the extruder. When the melt pressure is reduced to atmospheric pressure the gas formed in the extruder by the blowing agent citric acid or its derivatives will no longer be dissolved in the melt. Instead, the gas will form bubbles, i.e. cells, in the polymer melt which will grow until the melt is cooled down to a temperature where the viscosity of the melt is too high to allow further cell growth. The resulting cable jacket will be foamed which means that it contains dispersed gas bubbles, i.e. gas cells.

EXAMPLES

1. Measurement Methods

Melt Flow Rate

The melt flow rate (MFR) is determined according to ISO 1133 and is indicated in g/10 min. The MFR is an indication of the melt viscosity of the polymer. The MFR is determined at 190° C. for PE and at 230° C. for PP. The load under which the melt flow rate is determined is usually indicated as a subscript, for instance MFR2 is measured under 2.16 kg load (condition D), MFR5 is measured under 5 kg load (condition T) or MFR21 is measured under 21.6 kg load (condition G).

Density

Density of the polyolefin polymer was measured according to ISO 1183-1 method A on samples prepared according to ISO 17855.

Flexural Modulus

Flexural modulus was determined according to ISO 178: 2010. The test specimens were extruded tapes with a thickness of 2 mm. The length of the span between the supports was 64 mm, the test speed was 2 mm/min and the load cell was 100 N. The equipment used was an Alwetron TCT 10. The specimen were conditioned for minimum 16 hours at 23+/-2° C. and 50% relative humidity prior testing.

Tensile Testig According to EN60811-100
Stress at Break and Strain at Break

The stress at break and strain at break were measured in accordance with ISO 527-1: 2012 at 23° C. and 50% relative humidity on an Alwetron TCT 10 tensile tester at a speed of 25 mm/min. The extensometer used was MFE-900. The test specimens were extruded tapes with a thickness of 2 mm. The specimens were conditioned for minimum 16 hours at 23+/-2° C. and 50% relative humidity prior testing. The average value out of 6-10 samples is reported herein.

Degree of Expansion

The density of pellets is measured using a scale with density measurement, thereafter the density of a tape measured using the same technique. The expansion is the difference of density between pellets and tapes.

$$\text{Expansion} = \frac{d_{pl} - d_{pe}}{d_{pl}} * 100$$

Where
$d_{pl}$: density of the tapes in kg/m$^3$
$d_{pe}$: density of the pellet in kg/m$^3$

2. Materials

LLDPE: An unimodal chromium catalysed LLDPE copolymer with butene as comonomer with MFR2 of 0.85 g/10 min and a density of 920 kg/m$^3$.

LDPE: A tubular LDPE homopolymer with MFR2 of 2.0 g/10 min and density of 923 kg/m$^3$.

Tracel® PO 2217: An endothermic blowing agent masterbatch commercially available from Tramaco GmbH containing a derivate of citric acid and in which the amount of the derivate of citric acid is 100 wt % of the added blowing agents. The masterbatch further comprise a mineral nucleating agent and a polymeric carrier.

Expancel 980 MB 120: An exothermic blowing agent masterbatch commercially available from Akzo Nobel containing 65 wt. % of expandable polymeric microspheres and 35 wt. % of a carrier resin being a copolymer of ethylene vinylacetate (EVA).

Irganox 1010: Pentaerythritol-tetrakis(3-(3',5'-di-tert.-butyl-4-hydroxyphenyl)-propionate), antioxidant commercially available from BASF GmbH (CAS Number: 6683-19-8)

Irgafos 168: Tris(2,4-di-tert-butylphenyl)phosphate, stabilizer commercially available from BASF GmbH (CAS Number: 31570-04-4)

Calcium stearate

3. Preparation of Examples

Prior to testing, compositions according to table 1 were the blowing agent used in the inventive examples was compounded using a BUSS AG co-kneader on BUSS MDK46 continuous extruder (construction year 1985). The line is a single-screw kneader with screw diameter of 46 mm and 11 L/D. Compounding is a type of melt mixing of polymers where one or more polymers and/or additives are mixed in molten state. It is often used for dispersion and distribution of additives and fillers in a polymer melt.

For the inventive examples the blowing agent masterbatch Expancell 980 MB 120 or Tracel PO 2217 was mixed into polyolefin comprising LLDPE and LDPE in the compounding process. The blends used for producing the exemplified foamed tape samples were obtained by taking the mix containing the polyolefin material. The compositions were then extruded as tapes with a thickness of 2 mm on Collin extruder Teach-Line E 20 T with a 2 mm slit die and a screw speed of 55 rpm. After exiting the die, the tapes were cooled on rollers. Temperature settings are shown below and amount of blowing agent masterbatch Expancell 980 MB 120 or blowing agent masterbatch Tracel PO 2217 for each sample can be seen in Table 1.

T1: 50/170/210/210/210/210
T2: 50/170/220/220/220/220
T3: 50/170/230/230/230/230

The comparative example CE1 was produced in the same way, except that no blowing agent was added to the polyolefin material.

TABLE 1

All values are given in wt %.

|  | CE1 | IE1 and 2 | IE3 and 4 | IE5 and 6 |
|---|---|---|---|---|
| LLDPE | 84.7 | 84.2 | 83.7 | 83.7 |
| LDPE | 15 | 15 | 15 | 15 |
| Tracel PO 2217 |  |  |  | 1 |
| Expancel 980 MB 120 |  | 0.5 | 1 |  |
| Irganox 1010 | 0.175 | 0.175 | 0.175 | 0.175 |
| Irgafos 168 | 0.075 | 0.075 | 0.075 | 0.075 |
| Calcium stearate | 0.05 | 0.05 | 0.05 | 0.05 |

4. Results

TABLE 2

|  | CE1 | 1E1 | 1E2 | 1E3 | 1E4 | 1E5 | 1E6 |
|---|---|---|---|---|---|---|---|
| Foaming MB | n/a | Expancel 980 MB 120 | Expancel 980 MB 120 | Expancel 980 MB 120 | Expancel 980 MB 120 | Tracel PO 2217 | Tracel PO 2217 |
| MB addition (wt %) | 0 | 0.5 | 0.5 | 1 | 1 | 1 | 1 |
| Extrusion temperature | T1 | T1 | T2 | T1 | T2 | T2 | T3 |
| Expansion degree (%) | 0 | 6.6 | 5.3 | 17.3 | 18.4 | 6.3 | 6.5 |
| Stress at break (MPa) 25 mm/min | 20.5 | 14.1 | 15.3 | 9.6 | 11.4 | 17.6 | 17.2 |
| Strain at break (%) 25 mm/min | 799 | 658 | 686 | 544 | 598 | 773 | 767 |
| Flexural modulus (MPa) | 219 | 198 | 204 | 165 | 188 | 214 | 186 |

Two different foaming agents, Expancell 980 MB 120 and Tracel PO 2217 have been tested. Expancell 980 MB 120 has been used in two different amounts. Moreover, different extrusion temperature settings with maximum temperatures of 210° C., 220° C. and 230° C. have been tested. It can be seen that the higher the expansion degree, the lower the flexural modulus indicating increased flexibility and the lower the stress at break and strain at break indicating inferior tensile properties. However, surprisingly it has been found that an improved flexibility indicated by the lower value for the flexural modulus of the inventive examples can be obtained while the stress at break and strain at break remains acceptable.

The invention claimed is:

1. A cable comprising:
   a cable core; and
   at least one layer surrounding the cable core which comprises a foamed composition obtained by foaming a foamable polymer composition comprising:
   (A) a polyolefin polymer, wherein the polyolefin polymer (A) does not bear silane moieties and comprises 20 to 99.99 wt. % linear low density polyethylene based on the total weight of the foamable composition wherein the linear low density polyethylene has a density of 880 to 930 kg/m$^3$ measured according to ISO 1183-1 on samples prepared according to ISO 1872-2, and
   (B) a blowing agent in an amount of 0.01 to 3 wt. % based on the total foamable polymer composition, wherein the blowing agent consists of expandable polymeric microspheres, and the composition does not comprise fluororesin-,
   and wherein the foamable composition does not comprise polyolefin polymers bearing silane groups.

2. The cable according to claim 1, wherein the polyolefin polymer (A) has an MFR 2 of 0.1 to 10 g/10 min measured according to ISO 1133 at 190° C. and a load of 2.16 kg.

3. The cable according to claim 1, wherein the polyolefin polymer (A) further comprises 0.1 to 80 wt. % low density polyethylene based on the total weight of the foamable polymer composition.

4. The cable according to claim 1, wherein the composition does not comprise an azo compound and/or physical blowing agents.

5. The cable according to claim 1, wherein the foamable polymer composition comprises an antioxidant and/or an acid scavenger.

6. A method for the production of a layer of a cable, comprising extruding a foamable composition on a cable core, and foaming the foamable composition, wherein the foamable composition comprises
   (A) a polyolefin polymer, wherein the polyolefin polymer (A) does not bear silane moieties and comprises 20 to 99.99 wt. % linear low density polyethylene based on the total weight of the foamable composition wherein the linear low density polyethylene has a density of 880 to 930 kg/m$^3$ measured according to ISO 1183-1 on samples prepared according to ISO 1872-2, and
   (B) a blowing agent in an amount of 0.01 to 3 wt. % based on the total foamable polymer composition, wherein the blowing agent consists of expandable polymeric microspheres, and the composition does not comprise fluororesin,
   and wherein the foamable composition does not comprise polyolefin polymers bearing silane groups.

7. The cable according to claim 5, wherein the antioxidant is a phenolic antioxidant, a phosphorous containing antioxidant, or mixtures thereof.

8. The cable according to claim 5, wherein the acid scavenger is a calcium stearate, a zinc stearate, or mixtures thereof.

* * * * *